United States Patent [19]

Fujiwara et al.

[11] Patent Number: 4,742,559
[45] Date of Patent: May 3, 1988

[54] MANUAL-SCANNING IMAGE READER

[75] Inventors: Toshiaki Fujiwara, Nara; Shigeo Yoneda, Yamatokoriyama, both of Japan

[73] Assignee: Sharp Kabushiki Kaisha, Osaka, Japan

[21] Appl. No.: 898,512

[22] Filed: Aug. 21, 1986

[30] Foreign Application Priority Data

Aug. 21, 1985 [JP] Japan .................. 60-183299

[51] Int. Cl.4 .............................. G06K 9/22
[52] U.S. Cl. ....................... 382/59; 382/58; 358/294
[58] Field of Search .............. 382/58, 59, 65, 67; 358/294

[56] References Cited

U.S. PATENT DOCUMENTS 4,523,235 6/1985 Rajchman .................... 358/294
4,581,761 4/1986 Ichinokawa et al. ............ 382/59

FOREIGN PATENT DOCUMENTS 0016400 10/1980 European Pat. Off. ............ 382/59
3220016 12/1983 Fed. Rep. of Germany .
127676 10/1980 Japan ............................ 382/59

Primary Examiner—James J. Groody
Assistant Examiner—Michael D. Parker
Attorney, Agent, or Firm—Birch, Stewart, Kolasch & Birch

[57] ABSTRACT

A manual-scanning image reader which optically reads image such as characters and figures from a written surface by a manual scanning over said written surface, which consists of the following parts; a sensor for detecting the amount of movement of the image reader in the scanning direction as a linear movement sensor, a sensor for detecting the amount of deviation of the image reader in the direction perpendicular to the scanning direction as a deviation sensor and a device for reading in image data synchronously with output signals from the linear movement sensor in order to correct the input image data according to the output signals from the deviation sensor before eventually storing it in memory.

2 Claims, 6 Drawing Sheets

FIG. 7
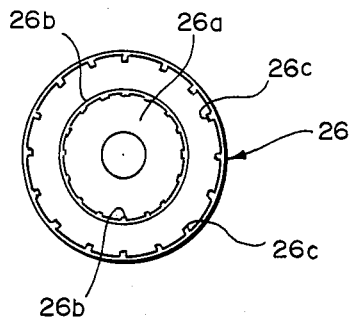
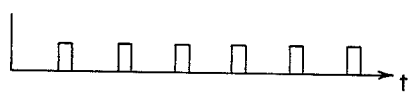
FIG. 8(a)
FIG. 8(b)
FIG. 9(a)
FIG. 9(b)
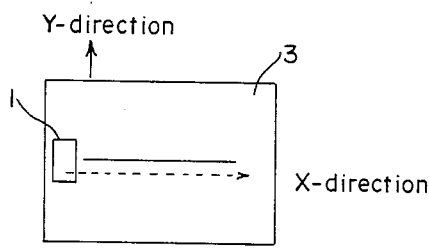
FIG. 10
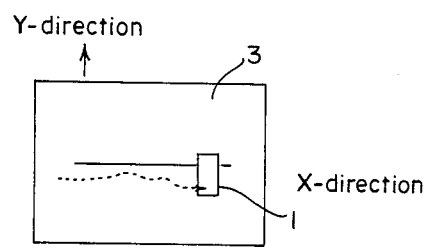
FIG. 11

MANUAL-SCANNING IMAGE READER

BACKGROUND OF THE INVENTION

The present invention relates to a manual-scanning image reader capable of optically reading images such as characters or figures from a written surface by manually scanning over a document. The images read is reproduced later by copying.

As shown in FIG. 18, conventional manual-scanning image readers have a rectangular shape with a number of one-dimensional image sensors 2 provided in a row on the bottom surface of the image reader, as in FIG. 19 shows. A conventional image reader 1 is operated manually to scan images such as characters 3' written on a paper 3 along the direction perpendicular to the long axis of the image sensors 2. This allows a row of image sensors 2 to read the images two-dimentionally.

One disadvantage of conventional manual-scanning image readers is the operator's difficulty in moving the reader along a straight line during scanning. Conventional mechanisms assure linear movement of the image reader through mechanical resistance generated by contact between it and the paper 3, which, however, often results in unstable operation. Thus as FIG. 20 shows, the scan tracks 5 of the image sensors 2 of a conventional manual-scanning image reader do not follow a straight line. Instead, a deviation "X" perpendicular to the scanning direction results, distorting an image data 6 is to be delivered to the image-reproduction system.

SUMMARY OF THE INVENTION

The present invention completely eliminates the disadvantage mentioned above by providing a novel manual-scanning image reader able first to measure the amount of deviation perpendicular to the scanning direction and then to correct the input image data by the measured amount of deviation. Through this process, the reader can successfully correct distorted input data caused by the deviation of the image reader. To achieve the above objects, the present invention provides a novel manual-scanning image reader capable of optically reading images such as characters and figures from a written surface through manual scanning. This image reader consists of the following; a sensor for detecting the travel distance of the image reader in the scanning direction, a sensor for detecting the amount of the scan track deviation that appears perpendicular to the scanning direction, and a control circuit which reads in image data synchronously with the output signals from the linear movement detecting sensor and corrects it according to the output signals from the scan track deviation detecting sensor before writing it into RAM memory.

BRIEF DESCRIPTION OF THE DRAWINGS

The present invention will be better understood from the detailed description given hereinbelow and the accompanying drawings which are given by way of illustration only, and thus are not limited to the present invention and wherein:

FIGS. 1 through 17 each depict one of the preferred embodiments of the manual-scanning image reader related to the present invention; in which FIG. 1 is a simplified block diagram of the control circuit governing operation of the image reader related to the present invention;

FIGS. 2 through 4 are respectively the front view, plain view and perspective view of the sensors that detect the amount of linear movement and the amount of deviation of the manual-scanning image reader;

FIG. 5 shows the bottom surface of the manual-scanning image sensor related to the present invention;

FIG. 6 is an exploded perspective view depicting part of the linear movement sensor related to the present invention;

FIG. 7 is an enlarged view showing part of the linear movement sensor shown in FIG. 6;

FIGS. 8 (a) and (b) and FIGS. 9 (a) and (b) are charts depicting the waveforms of pulses output when the sensor shown in FIG. 6 rotates counterclockwise and clockwise, respectively;

FIG. 10 is a chart explaining the image-reading operation;

FIG. 11 depicts the typical image-reading operation;

FIGS. 12 and 13 are, respectively waveforms charts of pulses output from the linear movement sensor and the deviation sensor when they are engaged in the image-reading operation shown in FIG. 11;

FIG. 14 is a chart showing the image data read by the operation shown in FIG. 11;

FIG. 15 is a chart showing the image data corrected from the input image data shown in FIG. 14;

FIG. 16 is a chart depicting operations for reading images of other information;

FIG. 17 is a chart depicting the input image data generating by the operations shown in FIG. 16;

DESCRIPTION OF THE PREFERRED EMBODIMENTS

Referring now to the appended drawings, one of the preferred embodiments of the present invention is described below.

Figure 1:
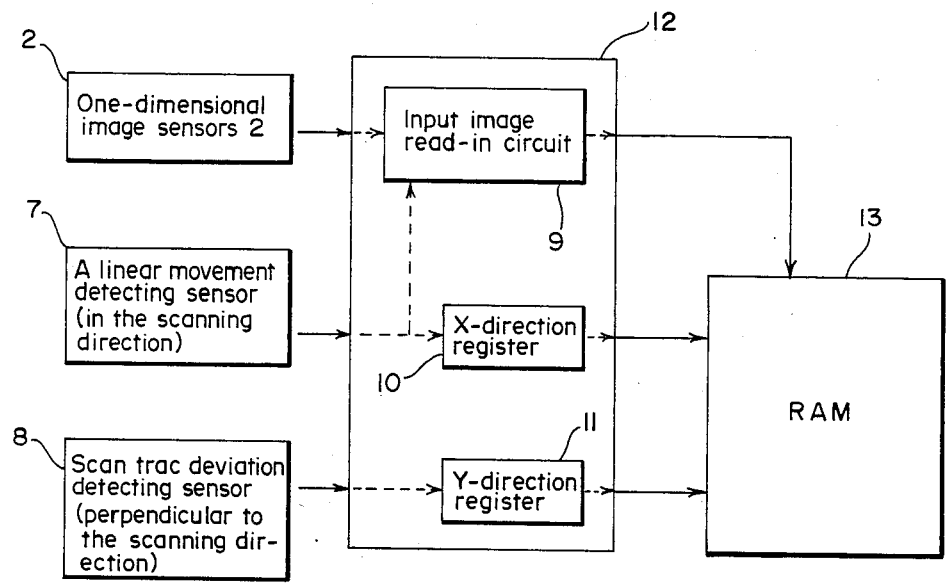
Figure 2:
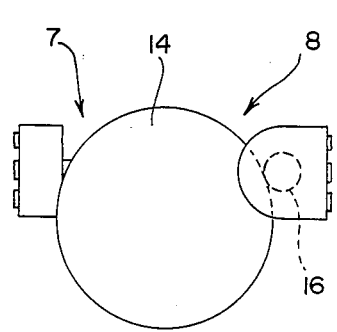
Figure 3:
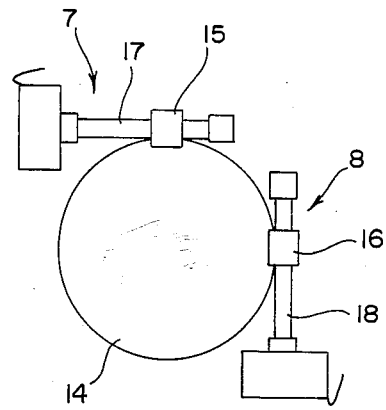

FIG. 1 is a simplified block diagram of the control circuit related to the present invention. Like a conventional system, a number of one-dimensional image sensors 2 are placed in a row for the optical reading of an image. In response to movement of the one-dimensional image sensors 2 in the scanning direction, a linear movement sensor 7 generates pulse signals at every predetermined amounts of movement in order to measure the travel distance of the image reader in the scanning direction.

A deviation sensor 8 detects the amount of deviation in the direction perpendicular to the scanning direction caused by movement of the image reader. An input image read-in circuit 9 receives one-dimensional image data output from the one-dimensional image sensors 2 synchronously with the signal output from the linear movement sensor 7 before storing it into a RAM memory 13. An X-direction register 10 consists of a counter that counts and latches signals from the linear movement sensor 7. The latched data functions as address data when the input image data is written into the memory 13. Likewise, a Y-direction register 11 latches the data output from the deviation sensor 8 so that the latched data can function as address data when the input image data is written into the memory 13. An input data-correcting control circuit 12 is comprised of the input image read-in circuit 9, the X-direction register 10 and the Y-direction register 11.

Figure 4:
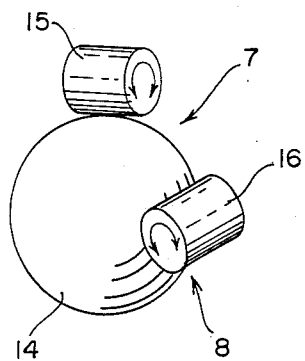

Next, referring to FIGS. 2 through 9, operations of the linear movement sensor 7 and the deviation sensor 8 are described below. As shown in FIG. 4, the sensors 7 and 8 which are always in contact with a ball 14 consist of the freely rotating ball 14 and contacts 15 and 16 respectively. As is clear from FIGS. 2 and 3 which respectively denote the front and plain views of the sensors 7 and 8, both cylindrical contacts 15 and 16 are coupled to rotation shafts 17 and 18. In addition, both contacts 15 and 16 are positioned perpendicular to each other, in contact with the ball 14.

Figure 5:
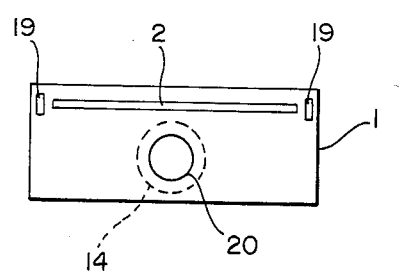
Figure 6:
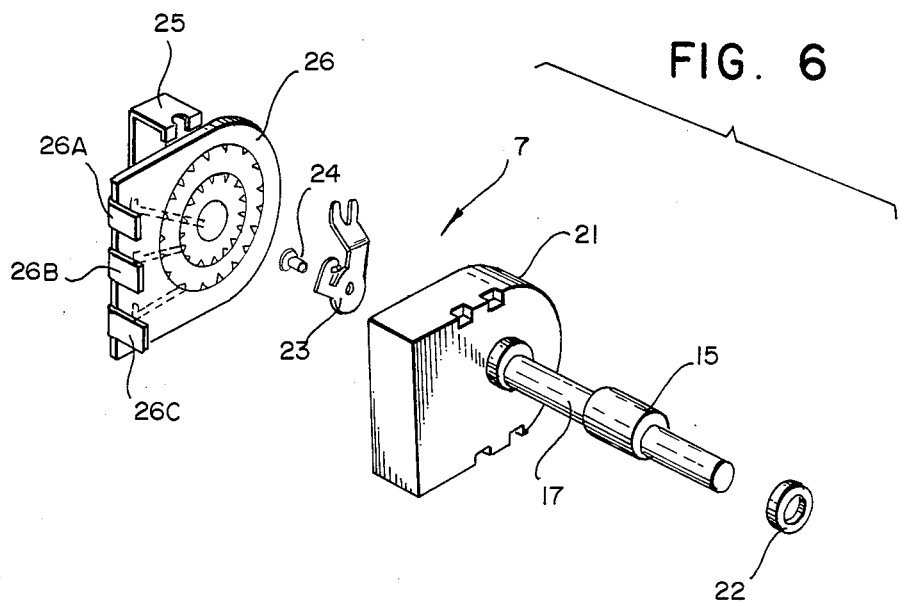

FIG. 5 shows the bottom surface of a manual-scanning image reader 1, on which a pair of rollers 19 are provided on either end of the row of one-dimensional image sensors 2 to allow the image reader 1 to move smoothly. A part of the ball 14 is exposed through a detection hole 20 set in the center of the bottom surface of the image reader 1. In response to the movement of the image reader 1, the ball 14 rotates freely, thus allowing both contacts 15 and 16 to detect the amount of movement of the ball 14 in the X and Y directions, respectively. The sensors 7 and 8 are in the same configuration and output pulse signals in response to the rotation of ball 14. Referring now to FIG. 6, which depicts the linear movement sensor 7, the constitution of the sensors 7 and 8 is described below. One end of a rotation shaft 17 is inserted through a sensor box 21 to allow the free rotation of the shaft 17 and secured to a rotary terminal 23 with a screw 24. The other end of the rotation shaft 17 is held by a rotation terminal 22 so that the shaft 17 and rotary terminal 23 rotate together. A printed circuit board 26 which is attached to the sensor box 21 with a stopper nail 25 has the circuit pattern shown in FIG. 7. There is a common terminal 26a in the center of the printed circuit board 26, an inner ring of contact terminals 26b, and an outer ring of contact terminals 26c respectively spaced at equal intervals. As the rotation shaft 17 turns, the rotary terminal 23 which moves together with the rotary shaft 17 periodically touches the contact terminals 26b and 26c, thereby completing an electrical connection between the common terminal 26a and either of these terminals 26b or 26c. Referring now to FIG. 6, the common terminal 26a and the contact terminal 26b and 26c are connected to terminal tabs 26A, 26B, and 26C, respectively. These tabs can then be connected to an external circuit. Each time the common terminal 26a and the contact terminals 26b or 26c are connected by the rotary terminal 23, a pulse is generated. As shown in FIG. 7, since the positions of the contact terminals 26b and 26c deviate slightly from a radial line, different waveforms are generated by the output pulses, according to the rotating directions of the rotary terminal 23. When the rotary terminal 23 turns counterclockwise, the output pulse generates the waveforms shown in FIG. 8. When it turns clockwise, the waveforms shown in FIG. 9 are generated. Charts (a) of FIGS. 8 and 9 describe the output pulses generated by the contact of the terminal 26b, while charts (b) of FIGS. 8 and 9 describe the output pulses generated by the other contact terminal 26c. The sensor detects not only the amount of linear movement and deviation, but also the direction of movement.

Figure 12:
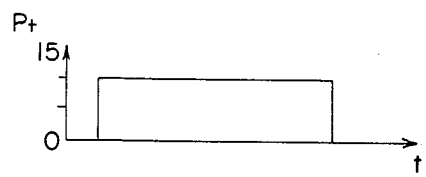

Next, referring to FIGS. 10, one of the preferred embodiments is described below. FIG. 10 depicts the input of a straight line drawn horizontally on a rectangular piece of paper 3. Direction X is the scanning direction and direction Y is the direction perpendicular to X. Ideally, the image reader 1 travels in a straight line, precisely matching the straight broken line of FIG. 10. However, since the operator performs the scanning by hand, it moves along the track shown by the broken line of FIG. 11. As a result, the actual input image data delivered to the input image read-in circuit 9 is distorted, as shown in FIG. 12. While manual scanning is underway, the X-direction register 10 latches the pulse signals output from the linear movement sensor 7, and the Y-direction register 11 latches pulse signals output from the deviation sensor 8. The latter pulse signals are output only when the movement of the image reader 1 deviates in the Y-direction.

Figure 13:
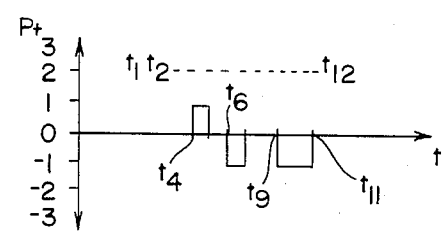
Figure 14:
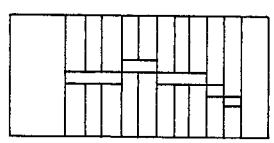
Figure 15:
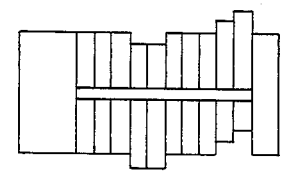
Figure 16:
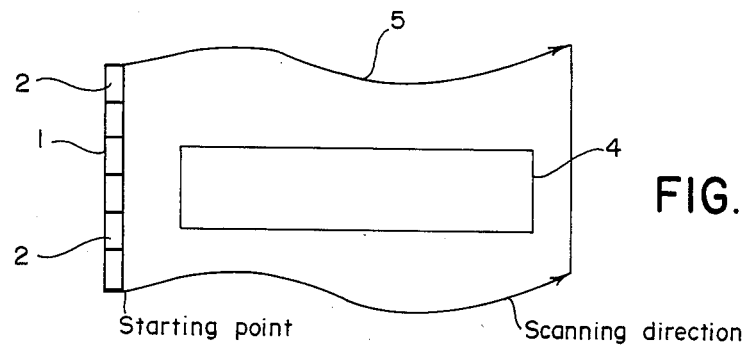
Figure 17:
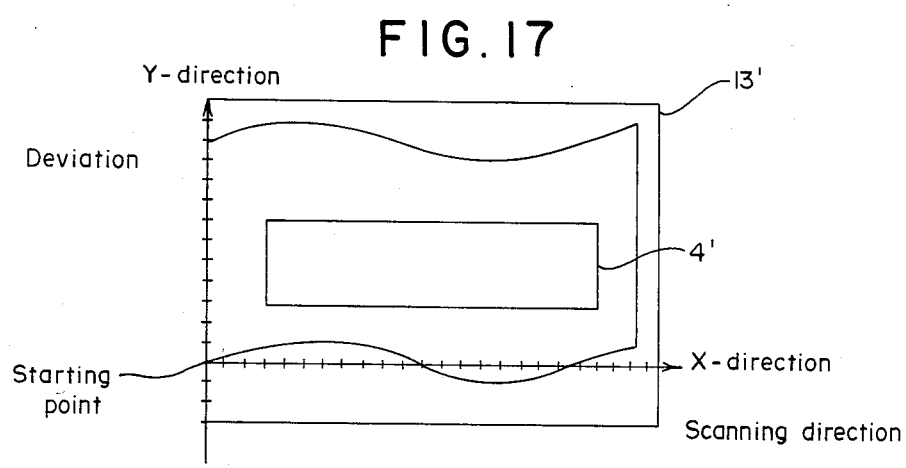
Figure 18:
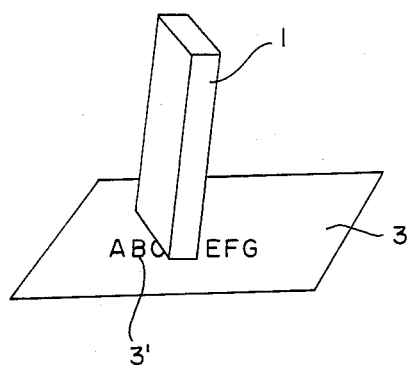
FIG. 18 is a perspective view of a device incorporating one of the preferred embodiments of the present invention.
Figure 19:
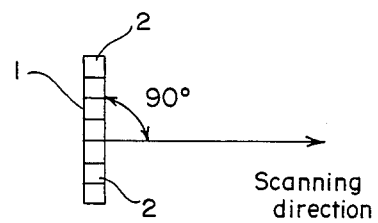
FIG. 19 is a chart explaining the scanning direction.
Figure 20:
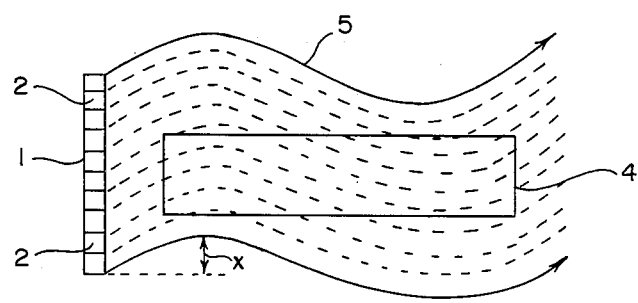
FIGS. 20 and 21 are, respectively, charts depicting the image-reading operation and the input image of a conventional manual-scanning image reader.
Figure 21:
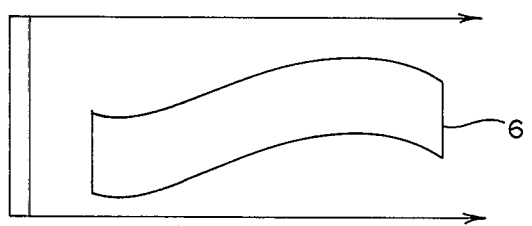

Next, the input image data delivered to the input image raed-in circuit 9 are written into the memory 13 according to the data latched by the X- and Y-direction registers as the address data. The image data is corrected to exactly match the original image on the paper 3 as shown in FIG. 15 before it is written into the memory 13. More concretely, according to one pulse output at time t4 in the positive direction shown in FIG. 13, the input image data is shifted by one pulse in the negative Y-direction at the addresses corresponding to times t4 and t5, then stored in the memory 13. Then the counter is reset to zero by one pulse in the negative direction at time t6 and another pulse in the position direction at time t4. According to the pulses output in the negative direction at times t9 and t10, the image data is then shifted in the positive Y direction at the address corresponding to time t9. At the address corresponding to time t10, the image data is shifted by an amount equal to the sum of the two pulses. After these operations, the image data is stored in memory 13, which allows the memory 13 to store corrected image data reflecting the original image on the paper 3, as FIG. 15 shows. To put it concretely, if the scan track of the image reader is deviated as shown 5 in FIG. 16, the image data read by the sensors 2 is input with distortion. However, as shown in FIG. 17, the image data 4' is written into the memory area 13' of the memory 13 only after it has been corrected to duplicate the original image 4.

As is clear from the foregoing description, in the manual-scanning image reader embodied in the present invention, calling the scanning direction the X-direction, and the direction of deviation perpendicular to direction X the Y-direction, the input image data which is continuously read in-in the X-direction during image reading may deviate in the Y-direction as a result of non-linear movements of the image reader. The input image data is shifted in the Y-direction by either a positive or a negative pulse output from the deviation sensor, thereby allowing the image reader to restore the correct, original image.

The preferred embodiment of the manual-scanning image reader reflecting the present invention provides a linear movement sensor in the scanning direction and a deviation sensor in the direction perpendicular to the scanning direction. This image reader reads in the image data synchronously with signals output from the linear movement sensor and then stores the input imaged data after correcting it with signals output from the deviation sensor. This eliminates even the slightest distortion of the input image and allows the control circuit to store the correct image on a written surface into the memory. Since the manual-scanning image reader reflecting the present invention includes a data correction system, it is no longer necessary for the image reader to guarantee stably linear motion in the scanning direction, which significantly improves the operating easability of the image reader.

While only certain embodiments of the present invention have been described, it will be apparent to those skilled in the art that various changes and modifications may be made therein without departing from the spirit and scope of the present invention as claimed.

What is claimed is:

1. A manual-scanning image reader which optically reads images such as characters and figures from a written surface by a manual scanning over said written surface comprising;

sensor means for detecting the amount of movement of said image reader in the scanning direction as a linear movement sensor;

sensor means for detecting the amount of deviation of said image reader in the direction perpendicular to the scanning direction as a deviation sensor; and means for reading in image data synchronously with signals output from said linear movement sensor and correct the input image data according to signal output from said deviation sensor before eventually storing it in memory.

2. The manual-scanning image reader defined in claim 1, in which said sensors for detecting the amounts of linear movement and deviation of said image reader consist of;

a ball rotating freely in conjunction with the movement of said image reader;

a rotation shaft held in contact with said ball via a contact;

a rotary terminal rotating together with said rotation shaft; and a number of contact terminals which are distributed in circular form on a printed circuit board at equal intervals in order to come into contact with said rotary terminal so that a pulse is generated for each contact throughout its rotation.

* * * * *